United States Patent Office 3,554,055
Patented Jan. 12, 1971

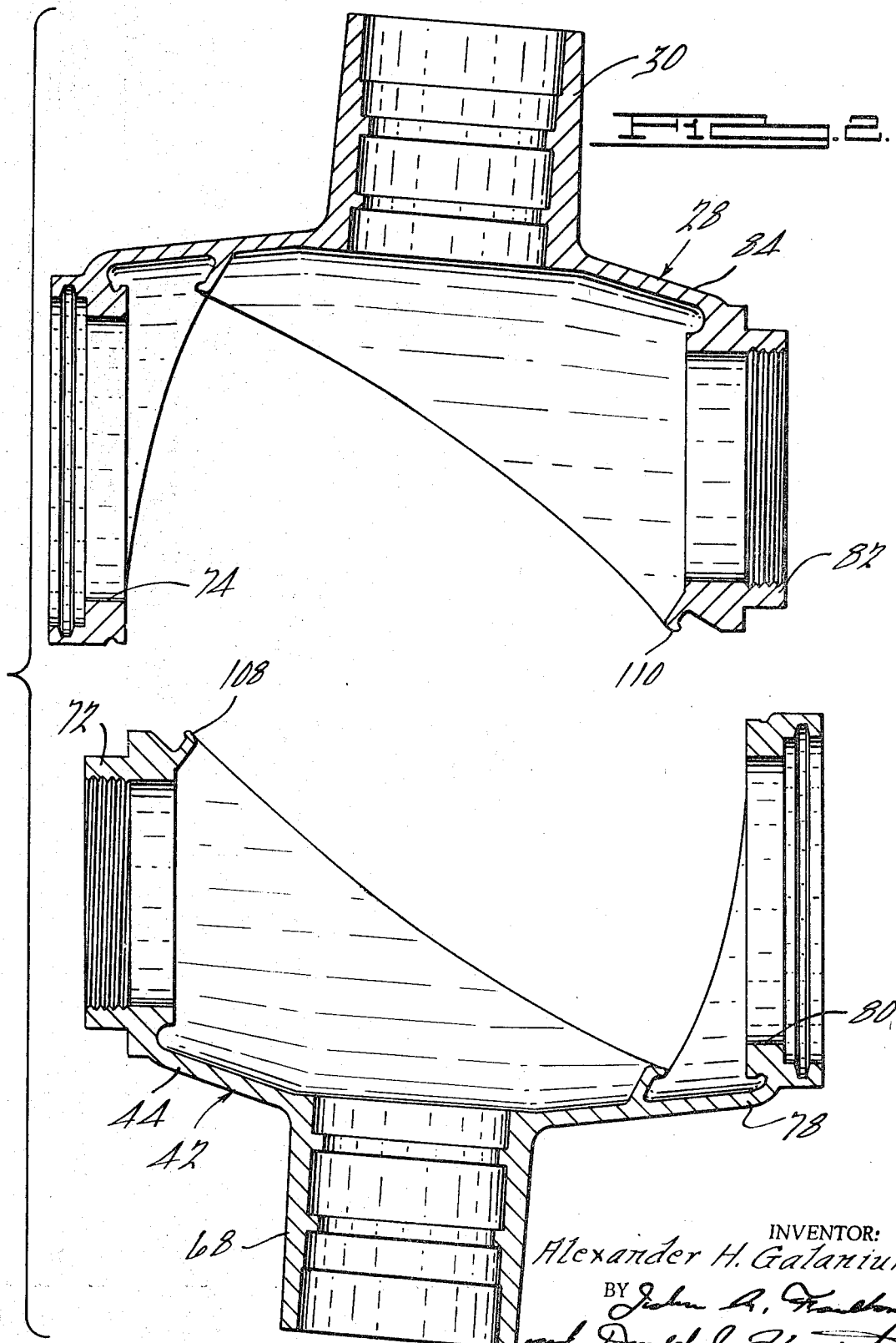

3,554,055
DIFFERENTIAL GEAR MECHANISM FOR AN AUTOMOTIVE VEHICLE DRIVELINE HAVING A FIXED DIFFERENTIAL HOUSING AND SWING AXLES
Alexander H. Galaniuk, Southfield, Mich., assignor to Ford Motor Company, Dearborn, Mich., a corporation of Delaware
Filed Jan. 10, 1969, Ser. No. 790,222
Int. Cl. B60k *17/16;* F16h *1/40*
U.S. Cl. 74—713                                6 Claims

ABSTRACT OF THE DISCLOSURE

A differential gear unit for connecting an automotive vehicle driveshaft to each of two axle shafts wherein the inboard ends of the two axle shafts may be disposed with less road clearance than their respective outboard ends thereby providing a low vehicle silhouette, the housing for the unit including two separate parts, one of which supports one axle shaft and the other of which supports the other axle shaft, said housing parts being mounted for oscillation with respect to each other about the center line of the power input shaft axis.

GENERAL DESCRIPTION OF THE INVENTION

It is common practice in the automotive industry to use differential gearing for establishing driving connections between a drive shaft and each of two axle shafts, each axle shaft being connected drivably to a vehicle traction wheel. The axle shafts usually are disposed coaxially with respect to each other, and they are generally parallel to the plane of the road surface. Since this is the case, it is necessary for the vehicle body to be disposed at a relatively elevated location with respect to the vehicle chassis.

By employing the improved axle and differential assembly of this disclosure, it is possible to provide a low vehicle body silhouette by arranging the positions of the axle shaft so that the inboard ends are lower than the outboard ends. But since the differential housing is fixed with respect to the chassis, provision must be made for allowing the axle shafts to oscillate about the axis of the power input shaft, the latter being disposed transversely with respect to the axes of the axle shafts.

This pivot action is accomplished in my improved invention by providing a bipartite housing, one axle shaft being journalled in one part of the housing and the other axle shaft being journalled in the companion part of the housing. The housing parts may be angularly adjusted with respect to each other, thereby permitting the outboard ends of the shafts to rise and fall in conformity with the movements of the traction wheels which are connected by means of universal joints to the outboard ends of the axle shafts. Adjustment of one housing part with respect to the other is accomplished without loss of fluid from within the housing.

Only one pair of universal joints is required in this arrangement since the pivotal action of the housing parts with respect to one another eliminates the need for an inboard universal joint connection between the differential output gears and the inboard ends of the axle shafts.

BRIEF DESCRIPTION OF THE FIGURES OF THE DRAWINGS

FIG. 2 shows the separate housing parts of FIG. 1.

PARTICULAR DESCRIPTION OF THE INVENTION

Figure 1:
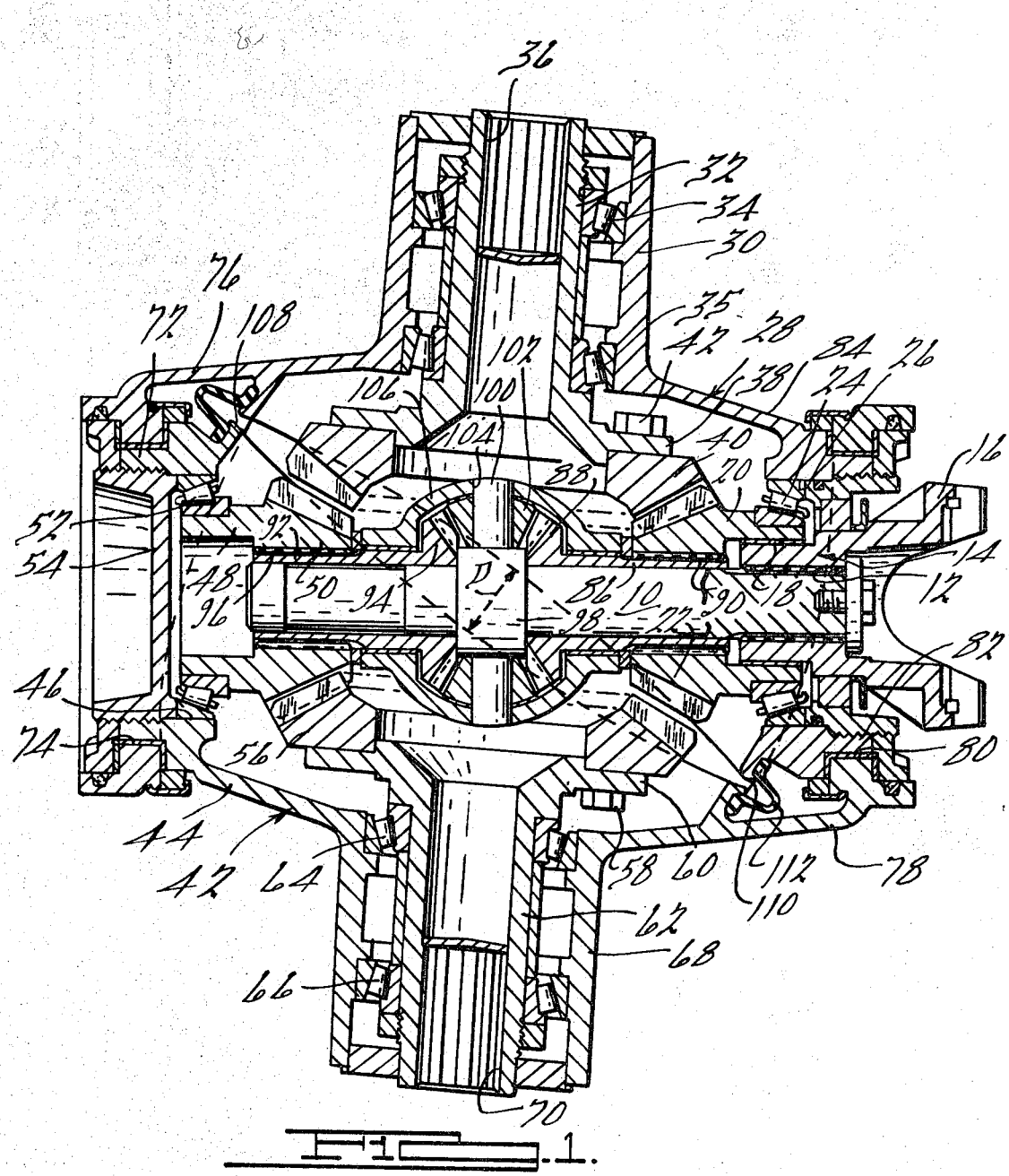
FIG. 1 shows a cross-sectional view of my improved differential-and-axle assembly, including a bipartite housing wherein one of the parts is adjustably mounted with respect to the other.

Numeral 10 designates a power input shaft for my improved differential-and-axle assembly. The right-hand end of the shaft 10 is splined at 12 to the stem 14 of the universal joint yoke shown at 16. This yoke comprises one torque delivery element of a universal joint connection between the shaft 10 and a drive shaft for an automotive vehicle.

Stem 14 is journalled within an opening 18 formed in the hub 20 for a differential bevel gear 22. The hub 20 is journalled by means of tapered roller bearings 24 within a bearing opening 26 formed in housing part 28.

Housing part 28 includes a sleeve 30 which surrounds power output shaft 32. Shaft 32 is journalled rotatably in the sleeve 30 by means of spaced tapered roller bearings 34 and 36.

Shaft 32 is in the form of a sleeve with internal splines 36 to which one end of an axle shaft is connected, the axle shaft being collinear with respect to the axis of the sleeve shaft 32.

Shaft 32 is connnected integrally with a ring gear flange 38 to which is bolted a bevel ring gear 40, suitable bolts 42 being provided for this purpose. Gear 40 engages drivably the bevel gear 22.

A differential housing includes also a housing part 42 which comprises an extension 44 in which is formed a bearing opening 46. The hub 48 of a differential gear 50 is journalled rotatably in the opening 46 by means of a tapered roller bearing 52. The outer race of bearing 52 is held axially fast with respect to the axis of the gear 50 by means of a threaded bearing retainer 54, which is received with a threaded portion of the opening 46.

Bevel gear 50 engages drivably bevel ring gear 56, which is bolted by means of bolts 58 to ring gear flange 60 formed on power output sleeve shaft 62. The sleeve shaft is journalled by means of spaced tapered roller bearings 64 and 66 within the housing sleeve extension 68 which forms a part of the housing part 42.

The power output sleeve shaft 62 is then splined at 70 to permit a driving connection with an externally splined end of an axle shaft, the latter being coaxial with respect to the shaft 62.

The housing extension 44 for the housing part 42 is provided with a bearing ring 72 having an external, annular bearing surface, and with an internal annular bearing surface 74 formed on the adjacent portion of housing extension 76 which forms a part of the housing part 28. In a similar fashion extension 78 for housing part 42 is formed with an internal annular bearing surface 80 which cooperates with an external bearing surface formed on bearing ring 82, the latter being formed on the extension 84 of the housing part 28.

Power input shaft 10 is disposed coaxially with respect to sleeve shaft 86 formed on differential side gear 88. Shaft 86 is externally splined to an internally splined opening in the differential bevel gear 22 as shown at 90. Shaft 10 extends also through sleeve shaft 92, which is formed integrally with differential side gear 94. Shaft 92 is splined at 96 to the differential bevel gear 50.

Shaft 10 is provided with a hub 98 from which extends pinion shafts 100. Differential pinions 102 are journalled rotatably on the shafts 100. The radially outward ends of the shafts 100 are received within openings 104 formed in differential casing 106. Casing 106 surrounds sleeve shafts 86 and 92 which are journalled rotatably within splined openings formed in each end of the casing 106. Pinions 102 engage drivably each of the differential side gears 88 and 94.

When torque is delivered to the shaft 10 from the drive shaft, the differential side gears 88 and 94 are driven because of the geared relationship between pinions 102 and each of the side gears. This causes differential bevel gears 50 and 22 to be driven. Gear 50 drives ring gear 56, which in turn drives the axle shaft connected to the sleeve shaft 62. Similarly, differential gear 22 drives ring gear 40 which in turn drives the axle shaft connected to the sleeve shaft 32. Thus each differential bevel gear 22 and 50 drives only a single ring gear and a single axle shaft.

If one axle shaft should rotate at a speed greater than the speed of rotation of the other axle shaft, the resulting differential motion causes differential side gears to rotate with respect to differential side gear 94. This differential motion occurs while torque continues to be delivered to each of the axle shafts, although the power distribution is different for each axle shaft by reason of the difference in speeds. This differential motion occurs whenever the vehicle executes a turning maneuver. During straight-ahead, normal driving of the vehicle, little, if any, differential motion occurs within the differential gearing.

Because only a single ring gear is driven by any one of the two differential bevel gears 22 and 50, it is possible to rotate the axle shafts about the axis of the shaft 10. This permits the inboard ends of the axle shafts to be lowered so that they have a reduced road clearance relative to the outboard ends of the axle shafts. The power input shaft 10 is mounted in this embodiment on the chassis and is fixed with respect to the chassis. Each of the housing parts 28 and 42 can be oscillated, however, with respect to each other and with respect to the axis of the shaft 10. In this way vehicle displacement of the outboard ends of the axle shafts can occur as the angular adjustment of the housing parts with respect to each other provides the necessary compliance. The outboard ends of the axle shafts, together with the wheel and the wheel suspension structure, is mounted on springs which in turn are carried by the vehicle chassis. Thus the wheels and the outboard ends of the axle shafts can move vertically, notwithstanding the fixed relationship of the housing with respect to the axis of the shaft 10.

The need for a separate universal joint at the inboard ends of each of the axle shafts is avoided. The necessary angular adjustment of the axle shafts with respect to the chassis occurs as one axle housing part oscillates with respect to the other.

The housing part 42 is formed with a circular margin 108. The margin 108 is situated in a plane that is angularly disposed with respect to the axis of shaft 10. In the particular embodiment shown, this angular relationship is about 35°. A corresponding annular margin 110 is formed on the housing part 28. It is situated in juxtaposed, adjacent relationship with respect to the margin 108.

The portions of the margins 108 and 110 that are relatively close to the bearing rings 82 and 72 are relatively close. As the distance between any point on the margins 108 and 110 is increased, the spacing between the margins increases. The maximum spacing between the margins occurs at the central regions of the differential mechanism as indicated by the dimensional arrow "D" shown in the drawing.

The clearances are provided to permit one housing part to oscillate with respect to the other without interference between the edges of the housing parts. This oscillation occurs, as mentioned earlier, as the vehicle traction wheel suspensions permit the wheels to rise and fall with respect to the road surface.

In order to retain lubricating liquid within the interior of the differential housing parts, a flexible annular seal 112 surrounds the margins 108 and 110. A spacing between margins 108 and 110 accommodates movement of one margin with respect to the other.

Having thus described a preferred form of my invention, what I claim and desire to secure by United States Letters Patent is:

1. A differential gear mechanism for use in an automotive vehicle driveline for delivering power from a power input shaft to each of two axle shafts, said mechanism having a housing with separate housing parts, said power input shaft being journalled rotatably in said housing, a first output gear rotatably journalled in one housing part, a second output gear journalled in another housing part, a pair of driving pinions, one pinion meshing with one gear and the other pinion meshing with the other gear, differential gear means located between said pinions and between said power output gears for connecting said power input shaft to each of said driving pinions, one end of one axle shaft being connected to one power output gear and one end of the other axle shaft being connected to the other output gear, each housing part having spaced coaxial bearing portions, one bearing portion of one housing part being journalled with respect to one bearing portion of the other housing part and the other bearing portion of said housing parts being journalled with respect to each other, the axes of said input shaft and said housing parts being restrained against relative displacement, one pinion being journalled in one bearing portion of one housing part and the other pinion being journalled in the other bearing portion of the other housing part, an axle shaft bearing support means on each housing part for journalling said axle shafts for rotation about axes that are disposed transversely with respect to the axes of said pinions, said housing parts enclosing said differential gear means, said pinions and said output gears and having juxtaposed peripheral margins, said margins having a gap therebetween to accommodate relative movement of said housing parts, the diameter of said pinions being substantially the same and the diameters of said output gears being substantially the same, the axis of each axle shaft being non-perpendicular with respect to the axis of said power input shaft, whereby said housing parts are adapted for oscillation about the axis of said power input shaft as torque is delivered from said power input shaft to said axle shafts through said differential gear means and through said pinions and output gears.

2. The combination as set forth in claim 1 wherein one bearing portion of one housing part defines an annular bearing ring, the cooperating bearing portion of the other housing part being received within said ring, the other bearing portion of said one housing part defining an annular bearing, the other bearing portion of said other housing part defining a bearing ring surrounding said annular bearing.

3. The combination as set forth in claim 2 wherein the axis of one bearing ring is coincident with respect to the axis of the other bearing ring, said coincident axes corresponding to the axis of said power input shaft.

4. The combination as set forth in claim 1 wherein one of said pinions is in driving engagement with one output gear and is out of engagement with respect to the other output gear, the other pinion being out of engagement with said one output gear and in driving engagement with said other output gear, whereby said ring gears and said housing parts within which each of them is journalled respectively may be oscillated about the axis of said power input shaft during torque delivery from said input shaft to said axle shafts.

5. The combination as set forth in claim 2 wherein one of said pinions is in driving engagement with one output gear and is out of engagement with respect to the other output gear, the other pinion being out of engagement with said one output gear and in driving engagement with said other output gear, whereby said ring gears and said housing parts within which each of them is journalled respectively may be oscillated about the axis of said power input shaft during torque delivery from said input shaft to said axle shafts.

6. The combination as set forth in claim 3 wherein one of said pinions is in driving engagement with one output gear and is out of engagement with the other output gear, the other pinion being out of engagement with said one output gear and in driving engagement with said other output gear, whereby said ring gears and said housing parts within which each of them is journalled respectively may be oscillated about the axis of said power input shaft during torque delivery from said input shaft to said axle shafts.

References Cited

UNITED STATES PATENTS

| | | | |
|---|---|---|---|
| 1,273,412 | 7/1918 | Salsbury | 74—713X |
| 1,514,862 | 11/1924 | Rumpler | 74—713X |
| 1,866,656 | 7/1932 | Ledwinka | 74—713X |
| 2,612,231 | 9/1952 | Bretschneider | 74—713X |
| 3,118,515 | 1/1964 | Kraus et al. | 180—73 |

FOREIGN PATENTS

| | | | |
|---|---|---|---|
| 766,710 | 4/1934 | France | 180—73 |
| 412,696 | 2/1946 | Italy | 74—713 |

CARLTON R. CROYLE, Primary Examiner

T. C. PERRY, Assistant Examiner

U.S. Cl. X.R.

180—73